June 23, 1970 W. SESHOLTZ 3,516,544
UNDERWATER AQUARIUM FILTER
Filed Oct. 25, 1968 3 Sheets-Sheet 3
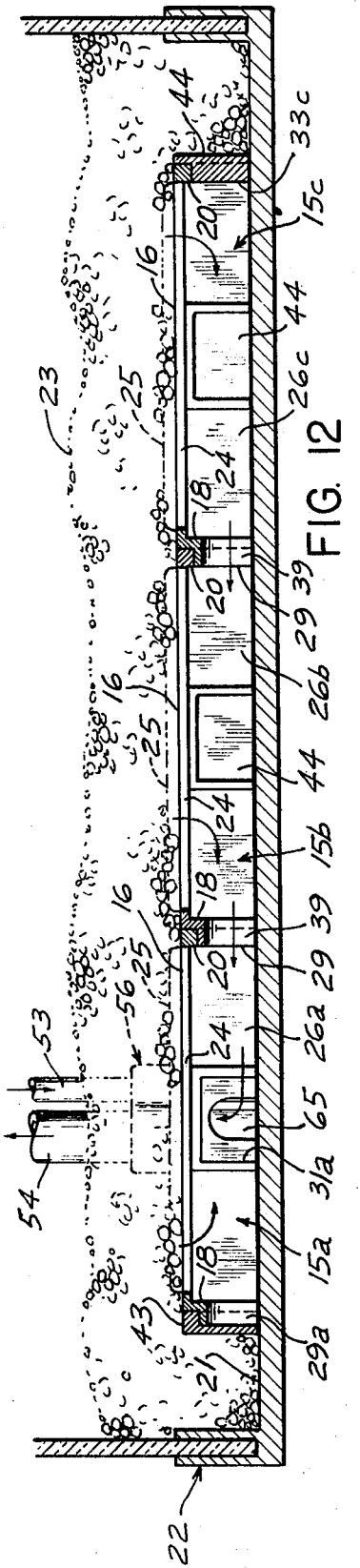
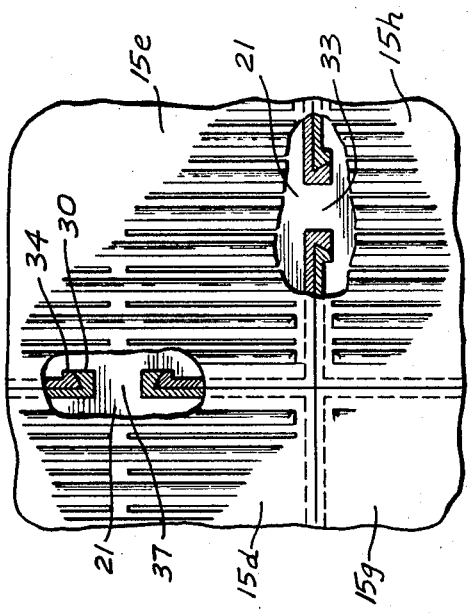
INVENTOR.
WALTER SESHOLTZ
BY
ATTORNEY

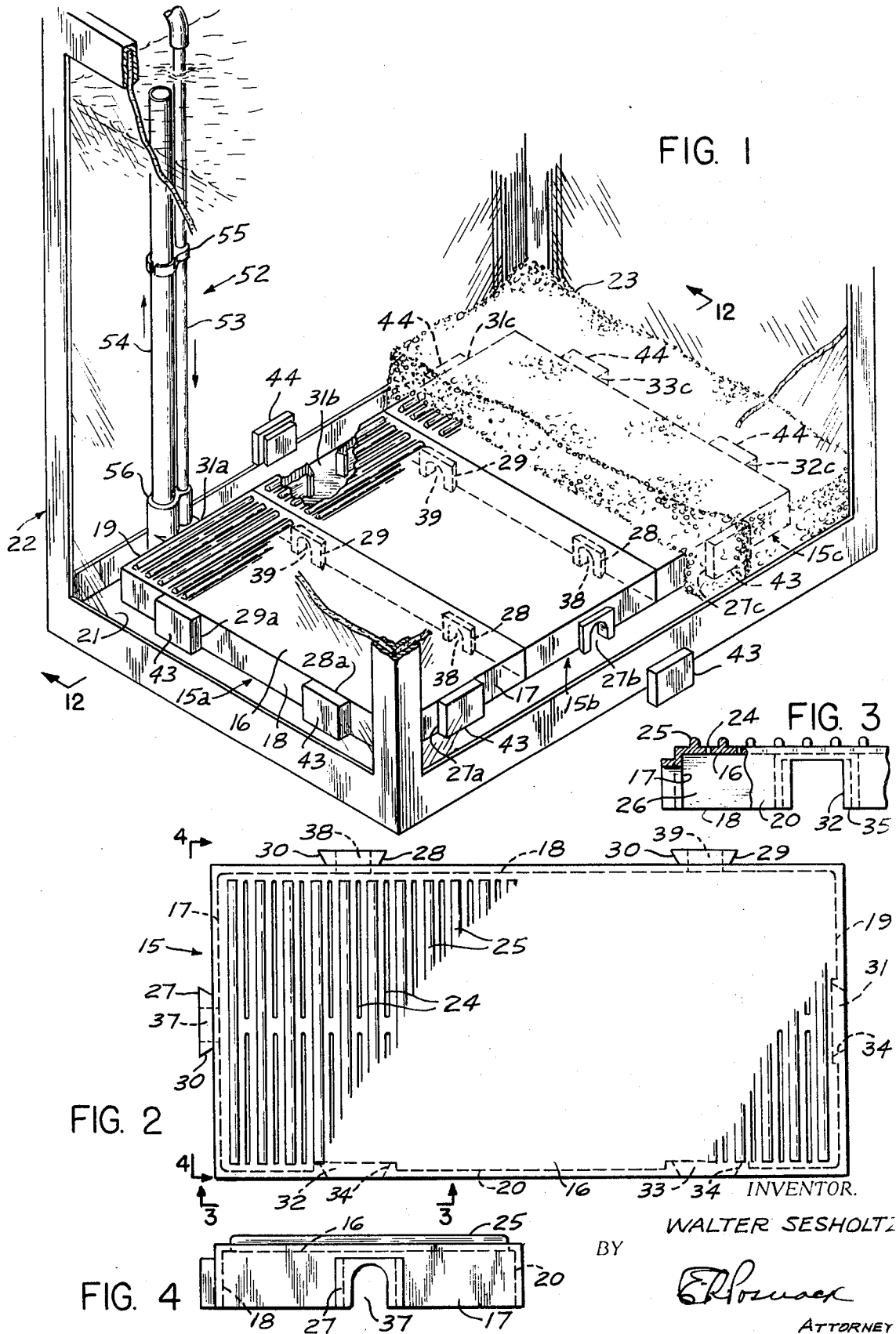
June 23, 1970     W. SESHOLTZ     3,516,544
UNDERWATER AQUARIUM FILTER
Filed Oct. 25, 1968
INVENTOR.
WALTER SESHOLTZ

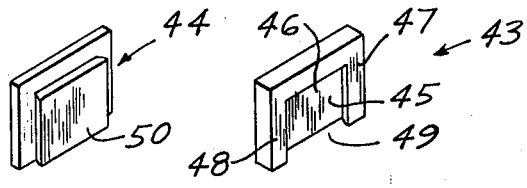
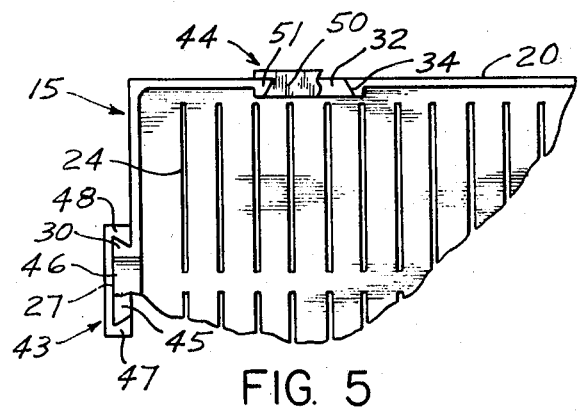
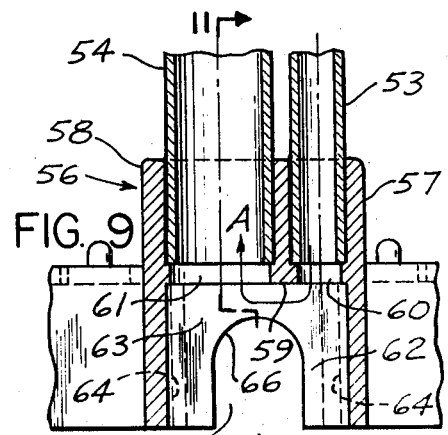
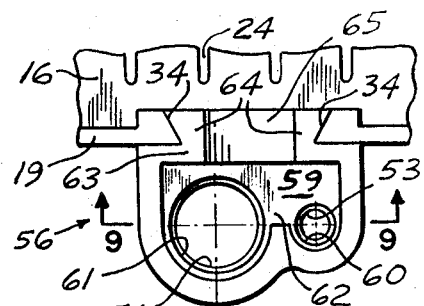
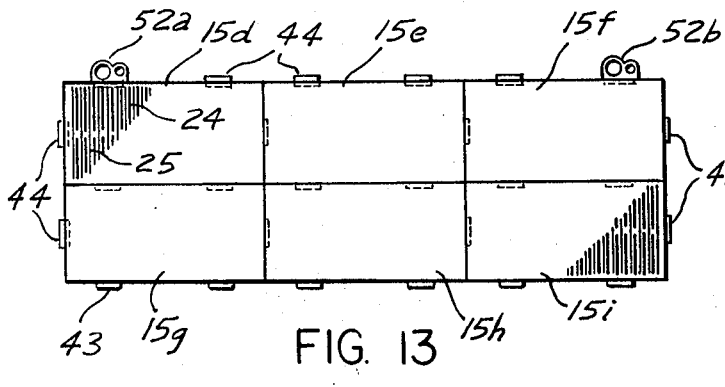
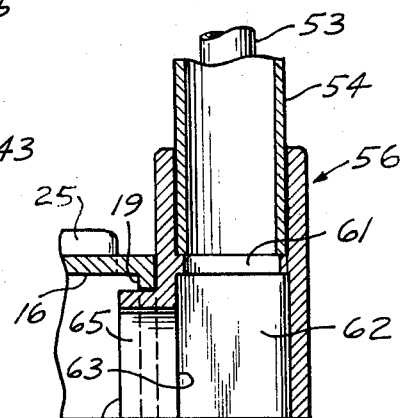
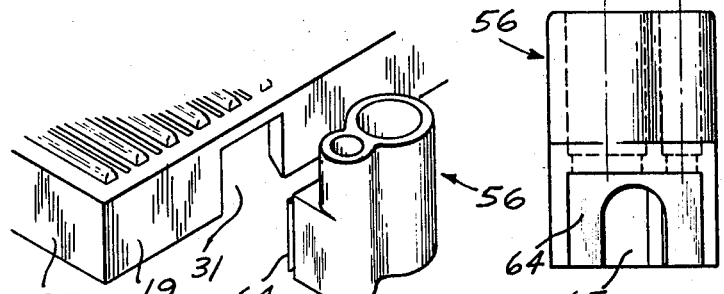

United States Patent Office 3,516,544
Patented June 23, 1970

3,516,544
UNDERWATER AQUARIUM FILTER
Walter Sesholtz, Park Ridge, N.J., assignor to Sternco Industries, Inc., Harrison, N.J., a corporation of New Jersey
Filed Oct. 25, 1968, Ser. No. 770,752
Int. Cl. *E04h 3/16, 3/20*
U.S. Cl. 210—169
11 Claims

ABSTRACT OF THE DISCLOSURE

A filter for placement upon the floor of a home aquarium and adapted to underlie a layer of filtering material such as gravel. The filter comprises a basic member that can either be used alone or in combination with a plurality of similar members. Said basic member comprises a substantially flat grated top wall with downwardly extending peripheral walls adapted to rest upon the aquarium floor, the top wall supporting said filter material, the peripheral walls having apertured portions serving as gates or conduits for the flow of filtered water therethrough. Said gates are adapted selectively to receive closures thereover or interconnect with corresponding gates in similar adjacent members, the gates also being adapted to receive a fitting connected to suction pumping means for returning the purified water to the top of the aquarium tank.

BACKGROUND OF THE INVENTION

Field of the invention

This invention relates to aquarium filters, and in particularly directed to undergravel filters for home aquariums.

The known art

It is a common practice to employ underwater filters positioned upon the aquarium floor and connected to a pumping device for returning the filtered water to the upper region of the aquarium, thereby effecting continuous circulating filtering action. Since aquarium tanks come in a great variety of sizes it is generally necessary to provide a corresponding variety of filter sizes, thereby imposing a cost burden both upon the fabricator and user. Moreover, stocking of variously sized filters is relatively uneconomical of space, besides causing special handling difficulties. Where it is attempted to use a number of small filter devices in a relatively large aquarium tank, such devices must be separately connected to pumping apparatus, resulting in a costly and often space-consuming arrangement.

OBJECTIVES OF THE INVENTION

It is an object of this invention to provide an economical and effective home aquarium filter having none of the above-mentioned shortcomings. More specifically, among the objects of this invention is the provision of a filter unit that can either be used alone or in combination with one or more identical units in various arrangements, that can be interconnected with and disconnected from similar units by simple manual manipulation, and that when operatively joined to other similar units will constitute an assembly operable as a unitary member and adapted for coactive use with one or more suction pumping means.

It is also an object of this invention to provide said filter units with a wall having structural means for supporting a load comprising relatively heavy filter material, such as gravel, and for maintaining said material out of clogging engagement with water-permeable portions of said wall.

Other objects, features and advantages will appear from the drawings and description hereinafter given.

SUMMARY OF THE INVENTION

In the preferred embodiment of this invention one or more basic members are employed for placement at the bottom of a home aquarium. Each basic member comprises a substantially rectangular casing having a substantially flat top wall with downwardly extending peripheral walls adapted to rest upon the aquarium floor the said top wall being adapted to support filtering material, such as gravel, and having slits to permit water permeating through the gravel to flow into the filtered water compartment defined by said walls.

The said peripheral walls have apertured portions comprising gates adapted to serve either as conduits for the flow of filtered water therethrough, or as receptacles for closure members. The gates are provided with interlocking means adapted for removable interconnection with complementary interlocking means of corresponding gates in adjacent coactively assembled basic members, whereby the coactively assembled components will be in communication with each other through the gate conduits. One or more of the gates are adapted to receive fittings connected to water discharge means, such as a suction pumping device, whereby the filtered water within the interconnected compartments can be drawn out and returned in purified condition to the upper portion of the aquarium.

Where a single basic member is employed, all the gates but one are sealed with said closure members, the open gate being operatively connected to said pumping means.

In the form illustrated, the said slits in the top wall of the basic filter member are arranged in parallel relation alternately with upwardly protruding ribs which give strength to said wall and keep gravel particles from clogging the slits.

DESCRIPTION OF THE DRAWINGS

FIG. 1 is a fragmentary perspective view of an aquarium containing an assembly of filter units according to one arrangement of this invention, parts being removed for clarity, certain elements being shown in disassembled positions.

FIG. 2 is a top plan view of FIG. 1.

FIG. 3 is a fragmentary side view of FIG. 2 looking in the direction of arrows 3—3.

FIG. 4 is an end view of FIG. 2 looking in the direction of arrows 4—4.

FIG. 5 is a fragmentary bottom view of the filter member of FIG. 2, showing closure cap members operatively in place.

FIG. 6 is a perspective view of a cap closure member adapted for operative connection to a female gate portion of the filter.

FIG. 7 is a perspective view of a cap closure member adapted for connection to a male gate portion of the filter.

FIG. 8 is a fragmentary perspective view of a portion of a filter unit and a pump fitting, the parts being shown in disassembled relation.

FIG. 8a is a front view of the fitting shown in FIG. 8.

FIG. 9 is a vertical fragmentary section of the assembly of the fitting of FIG. 8 and filter unit, the section taken substantially along line 9—9 of FIG. 10.

FIG. 10 is a bottom view of FIG. 9.

FIG. 11 is a section of FIG. 9 taken substantially along line 11—11.

FIG. 12 is a vertical section of FIG. 1 taken substantially along line 12—12.

FIG. 13 is a plan view of an assembly of six units according to another arrangement of this invention.

FIG. 14 is an enlarged fragmentary plan view of FIG. 13 with portions broken away for clarity.

DESCRIPTION OF PREFERRED EMBODIMENTS

The basic unitary filter casing 15 of this invention may either be used alone or in combination with a plurality of similar members, as will appear from the description hereinbelow given. Said member 15 comprises a substantially flat grated top wall 16 with downwardly extending peripheral walls 17, 18, 19 and 20 adapted to rest upon the floor 21 of the aquarium 22, the said top wall 16 being adapted to support a layer of filter material such as gravel 23 (FIG. 1). In the embodiment illustrated, said top wall contains a plurality of parallel slits 24 and a plurality of parallel upwardly protruding ribs 25, the preferred construction comprising an alternate arrangement of transversely extending slits and ribs.

The said slits 24 permit aquarium water that has filtered through the gravel 23 to flow downwardly into the bottom pure-water compartment 26 defined by said top wall 16, the peripheral walls 17, 18, 19 and 20, and the underlying aquarium floor 21. The said ribs 25 serve the double function of reinforcing the top wall 16 to enable it safely to support the overlying gravel load along the entire span of its length, and of supporting gravel particles above said slits and thereby keep them from clogging the slits, thus facilitating the operative downward flow of aquarium water.

Each of said peripheral walls 17, 18, 19 and 20 has one or more gates to permit the flow of water into and out of the pure-water compartment with which said gates are in communication, said gates being adapted to operatively accommodate closure members for preventing such flow at selected regions. In the form of this invention illustrated, end walls 17 and 19 each has one gate, and side walls 18 and 20 each has two gates. The gate 27 of end wall 17, and the gates 28 and 29 of side wall 18, each contains a male interlocking element illustrated as an outwardly protruding dovetail key 30. The gate 31 of end wall 19, and the gates 32 and 33 of side wall 20 each contains a female recessed portion 34 proportioned to slidably receive a male interlocking element corresponding to said key 30, the bottom end 35 of each of said recessed portions being open. The male interlocking elements have passageways extending therethrough, to wit, gate 27 has passageway 37, gate 28 has passageway 38 and gate 29 has passageway 39. Each of said passageways is open at the bottom and closed at the sides and top, thereby permitting water at the level of said aquarium floor 21 to flow therethrough.

Adapted for coactive engagement with said male and female interlocking elements at said respective gates are appropriately shaped and proportioned closure members. In the form of the invention illustrated, the closure members 43 are caps adapted for coactive engagement with the above-described respective dovetail key members 30 constituting the male interlocking elements; and the closure members 44 are caps adapted for coactive engagement with the above-described respective female recessed portions 34 constituting the said female interlocking elements. Each closure cap 43 comprises a recessed portion 45 defined by the closure wall 46 and opposite lateral walls 47 and 48, the bottom 49 being open to enable the cap to be slidably fitted over the corresponding key member 30. Each closure cap 44 has a protruding key element 50 proportioned for slidable engagement with the corresponding recessed portion 34 and a flanged closure wall 51 for flush engagement with the corresponding peripheral wall. The vertical height of each of said closure caps is such that when operatively in place the bottom of the cap will be at the same level as the bottom of the peripheral walls, so as to effect a complete closing of the gates with which said respective caps are operatively associated when the filter is operatively positioned on the aquarium floor.

The discharge of the filtered water from compartments 26 is effected by the twin-pipe pumping assembly 52 comprising the air inlet pipe 53, the adjacent water outlet pipe 54, the clamp 55 in engagement with said pipes, and the base fitting 56 adapted to support the said pipes 53 and 54 in their operative positions. Said fitting has two adjacent cylindrical sockets 57 and 58 with an intermediate base 59 upon which the bottom ends of said pipes rest, said base having apertured portions 60 and 61 communicating with the laterally enclosed lower chamber 62. The front wall 63 of said fitting 56 contains the forwardly protruding interlocking key element 64 proportioned to slidably fit into a selected one of the said female recessed portions 34, said front wall containing an apertured passageway 65 adapted to communicate between the compartment 26 of the filter member 15 and said chamber 62 of the fitting 56, the top 66 of said passageway being spaced below said intermediate base 59.

FIGS. 1 and 12 show an operative arrangement of three interconnected filter members positioned on the floor 21 of the aquarium 22, said filter members being identified by the reference numerals 15a, 15b and 15c. The correspondingly positioned interlocking male and female elements of adjacent filter members are brought into coactive engagement by slidably manipulating the male key members 30 of one of the filter members into the corresponding female recessed portions 34 of the adjacent filter members. In the assembly shown in FIGS. 1 and 12, peripheral walls 20 and 18 of the respective filter members 15a and 15b are in abutment, and peripheral walls 20 and 18 of the respective filter members 15b and 15c are in abutment, said filter members being maintained in their operative abutting positions by the said interlocked elements. It will be noted that the three pure-water compartments 26a, 26b and 26c are in intercommunication through the passageways 38 and 39 at the respective gates 28 and 29. At gate 31a the said fitting 56 is connected, the said pipes 53 and 54 extending upwardly. All the other peripheral gates are capped by the said closure members 43 and 44, closure members 43 closing the gates 27a, 27b, 27c, 28a and 29a, and the closure members 44 closing the gates 32c, 33c, 31c and 31b (not shown).

In the operation of this device, air is pumped downwardly through pipe 53, the air passing down through the aperture 60 into the top of chamber 62 from which it turns to flow upwardly through the adjacent aperture 61 in the direction of arrow A. The upward movement of the air will produce a partial vacuum in chamber 62, causing water to be drawn from the adjacent compartment 26a through the said passageway 65 and up through the outlet pipe 54—all in a manner known to those skilled in the art. The operative pumping action of the said twin-pipe assembly thus draws water from all three interconnected filter compartments 26a, 26b and 26c to be discharged from said pipe 53 into the upper region of the aquarium 22. And since the water in said compartments has been filtered in passing through the layer of filtering material 23 downwardly through the grated wall 16, this device effects a continuous filtering action over the entire area of the aquarium floor covered by the interconnected filter units 15.

Various filter combinations other than that shown in FIGS. 1 and 12 can be employed within the contemplation of this invention, depending upon the aquarium filter area it is desired to cover. Thus in FIG. 13 there are six filter members 15d, 15e, 15f, 15g, 15h, 15i, interconnected in the manner above described. In this arrangement, because of the extended area covered by the six-unit assembly, two pump-pipe assemblies 52a and 52b are employed, each operatively connected to two coactive gates, all the other peripheral gates being covered, in the manner aforesaid, by closure members 43 and 44. And should it be desired to employ a single filter member 15, the pump assembly 52 is operatively connected to one of the gates, such as at gate 31, all the other gates being capped by the said closure members 43 and 44.

In the above description, the invention has been disclosed merely by way of example and in preferred manner; but obviously many variations and modifications may be made therein. It is to be understood, however, that the invention is not limited to the specifically exemplified form.

I claim:

1. In a filter assembly for placement at the bottom of an aquarium tank, a plurality of interconnected filter members each having a casing with a perforated top wall for supporting filter material and peripheral walls joined to said top wall, said top and peripheral walls of each of said casing defining a filtered water compartment, water conduit means in each said casing intercommunicating with a corresponding compartment thereof, said water conduit means including respective interconnecting means holding the casings of the interconnected filter members in abutment with one another and with the water conduit means thereof in registered relation whereby said compartments are in communication with each other, closure means in removable engagement with selected interconnecting means which are unconnected with other filter members, and water discharge means operatively connected to at least one of said compartments, said interconnecting means and said water closure means being so constructed and arranged to provide interchangeable interconnection one with the other, said interconnecting means comprising male and female interlocking members on opposite peripheral walls, said members having respective openings therein, said male interlocking member of one filter guidably protruding through the opening of a female interlocking member of a second filter to provide interconnected engagement between filters and communication between the filters via the openings in the male and female members.

2. In a filter for placement at the bottom of an aquarium tank, the combination according to claim 1, said water discharge means having a fitting operatively connected to one of said interconnecting means.

3. In a filter for placement at the bottom of an aquarium tank, the combination according to claim 2, said interconnecting means comprising a plurality of interlocking elements at least one of said interlocking members being adapted for coactive engagement with said fitting, said interlocking members being adapted for coactive engagement with the casing of an operatively selected one of said other filters.

4. In a filter for placement at the bottom of an aquarium tank, the combination according to claim 3, said respective closure means having complementary locking members adapted for coactive engagement with said interlocking members of said casing.

5. In a filter for placement at the bottom of an aquarium tank, the combination according to claim 1, said peripheral walls extending downwardly from said top wall and being adapted to rest upon the floor of the aquarium tank.

6. In a filter for placement at the bottom of an aquarium tank, the combination according to claim 1, said conduit means comprising gates disposed in said peripheral walls with apertured portions extending from predetermined upper portions of said respective peripheral walls to the respective bottoms thereof, whereby when said casing is operatively positioned on the floor of the aquarium tank the bottom of said conduit means will be at the level of said floor.

7. In a filter for placement at the bottom of an aquarium tank, the combination according to claim 1, said perforated top wall having a plurality of parallel slits and a plurality of upwardly protruding ribs positioned adjacent said slits.

8. In a filter for placement at the bottom of an aquarium tank, the combination according to claim 1, said casing being of substantially rectangular configuration, said male members being disposed on two adjacent ones of said peripheral walls, and the female members being disposed on the other two of said peripheral walls, whereby the interlocking members may be operatively interconnected with suitable complementary interlocking members on operatively adjacent similar filter casings.

9. In a filter assembly for placement at the bottom of an aquarium tank, the combination according to claim 1, said casings being arranged with corresponding adjacent walls in mutual engagement, said conduit means comprising apertured gates, certain of said gates in mutually engaged walls being removably interengaged and being in communication with each other.

10. In a filter assembly for placement at the bottom of an aquarium tank, the combination according to claim 9, certain others of said gates having removable closure means thereover.

11. In a filter assembly for placement at the bottom of an aquarium tank, the combination according to claim 10, said water discharge means being removably connected to at least one of said gates.

References Cited

UNITED STATES PATENTS

| 2,636,473 | 4/1953 | Schwartz et al. | 210—169 X |
| 2,748,075 | 5/1956 | Hovlid | 210—169 |
| 2,935,199 | 5/1960 | Willinger | 210—169 |

REUBEN FRIEDMAN, Primary Examiner

T. A. GRANGER, Assistant Examiner

U.S. Cl. X.R.

119—5